United States Patent [19]

Griffin

[11] 4,195,697
[45] Apr. 1, 1980

[54] SHOVEL COUPLING WITH ANGLE OF ATTACK ADJUSTMENT

[76] Inventor: Robert M. Griffin, Box P, Chester, Mont. 59522

[21] Appl. No.: 876,886

[22] Filed: Feb. 10, 1978

[51] Int. Cl.² .......................................... A01B 15/00
[52] U.S. Cl. ................................. 172/730; 172/744; 172/762; 403/373
[58] Field of Search .............. 172/724, 730, 734, 739, 172/740, 744, 753, 762, 763; 403/373, 379

[56] References Cited

U.S. PATENT DOCUMENTS

| 286,485 | 10/1883 | Prior | 172/763 X |
|---|---|---|---|
| 1,586,712 | 6/1926 | Simons | 172/724 |
| 2,595,353 | 5/1952 | Graham | 172/730 |
| 3,061,021 | 10/1962 | Shader | 172/762 X |
| 3,156,307 | 11/1964 | Bledsoe | 172/744 |
| 3,773,114 | 11/1973 | Griffin | 172/762 |

FOREIGN PATENT DOCUMENTS 505252  8/1954  Canada ..................... 172/724

Primary Examiner—Richard T. Stouffer
Attorney, Agent, or Firm—Clarence A. O'Brien; Harvey B. Jacobson

[57] ABSTRACT

A coupling for attaching a sweep shovel to a cultivator shank including an adapter block rigidly affixed to the shank with the shovel and adapter block including transverse aperture arrangements fo receiving fastening devices with selective arrangement of the fastening devices and apertures enabling the angle of attack of the sweep shovel to be adjusted depending upon the soil conditions and the requirements of individual users.

2 Claims, 2 Drawing Figures

SHOVEL COUPLING WITH ANGLE OF ATTACK ADJUSTMENT

BACKGROUND OF THE INVENTION

1. Field of the Invention

The present invention generally relates to a coupling or attachment between a sweep shovel and a supporting shank of a cultivator which includes an adapter block attached to the rear of the cultivator shank and provided with a plurality of transverse apertures selectively aligned with apertures in the sweep shovel to enable adjustment of the sweep shovel in relation to the shank in order to vary the angle of attack of the sweep shovel.

2. Description of the Prior Art

In my prior U.S. Pat. No. 3,773,114, issued Nov. 20, 1973, for Shovel Coupling, there is disclosed a coupling for attaching a sweep shovel to a cultivator shank which includes an adapter block associated with the shank, sweep shovel and a connecting fastener to mount the sweep shovel on the lower end of the cultivator shank. The prior art cited during prosecution of the application which matured into that patent discloses various structures relating to this field of endeavor and, in addition, the following U.S. patents disclosure structures relating to the coupling of cultivator shovels to cultivator shanks:

U.S. Pat. Nos. 262,461—Aug. 8, 1882—Nutter; 623,645—Apr. 25, 1899—Young; 3,125,170—Mar. 17, 1964—Rosenvold; 3,792,736—Feb. 19, 1974—Gondeiro.

SUMMARY OF THE INVENTION

An object of the present invention is to provide a shovel coupling for attaching a sweep shovel to a cultivator shank which includes an adapter block rigidly affixed to the cultivator shank and provided with a plurality of spaced transverse apertures for selective alignment with transverse apertures in the sweep shovel for receiving fasteners and enabling adjustment of the shovel in relation to the shank for adjusting the angle of attack of the shovel depending upon soil conditions and the requirements of individual users of the cultivator.

Another object of the invention is to provide a coupling in accordance with the preceding object in which the adapter block is rigidly affixed to the rear surface of the shank by a pair of fasteners extending through apertures in the shank with the fasteners also extending through a plate disposed against the forward surface of the shank and engaging the neck portion of the sweep shovel to reinforce the sweep shovel at a point where needed to reduce breakage of the shovel.

A further object of the invention is to provide a coupling in accordance with the preceding objects in which the adapter block is provided with a plurality of transverse apertures generally spaced from each other along the vertical arc of curvature of the shank so that the sweep shovel will be adjusted along the arc of curvature of the shank to vary the angle of attack depending upon which of the apertures are used to secure the sweep shovel to the shank, so that any of the presently standard stem angles of 43 degrees, 47 degrees and 50 degrees may be utilized.

Still another object of the present invention is to provide a shovel coupling in accordance with the preceding objects in which the sweep shovel is constructed to utilize a large percentage of sheet stock materal when stamped therefrom, thereby providing for more effective use of materials.

Still another feature of the invention is to provide a shovel coupling in which the retaining plate along the forward surface of the shank may be duplicated to serve as a shim when a smaller shank is used in the cultivator, thereby maintaining a constant dimension between the transverse apertures in the adapter plate and the front of the front plate on the shank.

These together with other objects and advantages which will become subsequently apparent reside in the details of construction and operation as more fully hereinafter described and claimed, reference being had to the accompanying drawing forming a part hereof, wherein like numerals refer to like parts throughout.

DESCRIPTION OF THE PREFERRED EMBODIMENTS

Figure 2:
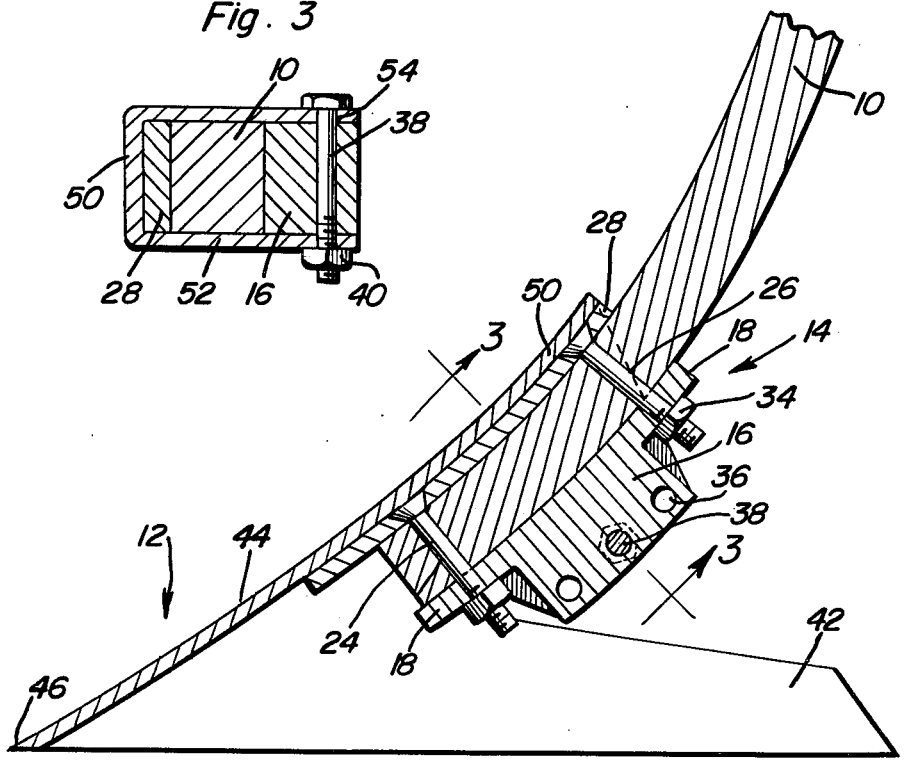
FIG. 2 is a longitudinal, sectional view through the shovel coupling illustrating the structural details of the invention.

Referring now specifically to the drawings, the cultivator shank or stem 10 extends downwardly and forwardly in an arcuate curve with the stem angle in the industry being standardized at 43 degrees, 47 degrees and 50 degrees with respect to vertical so that a desired angle of attack of the sweep shovel generally designated by numeral 12 will be at a desired angle in relation to the soil to be cultivated. For connecting the sweep shovel 12 to the cultivator shank 10, a coupling generally designated by numeral 14 is provided which includes an adapter block 16 having plate-like extensions 18 at each end edge thereof with the block 16 and extensions 18 including a forwardly facing surface 20 which is arcuate to conform with and engage the rear surface of the shank 10, as illustrated in FIG. 2. Each of the plate-like extensions 18 is provided with an aperture 22 therethrough for receiving fastener bolts 24 which also extend through spaced apertures 26 in the lower end of the shank 10. The adapter block 16 is oriented in opposed relation to a front plate 28 which has countersunk apertures 30 extending therethrough in alignment with the apertures 26 and 22 for receiving the fasteners 24 which are in the form of screw threaded bolts, cap screws, or the like, having any type of countersunk head with a straight slot or kerf, polygonal socket 32 or any other socket in the head thereof so that when the fasteners 24 are assembled, the end surface of the bolt heads will be flush with the plate 28 as illustrated in FIG. 2. Threaded nuts 34 are provided on the threaded end of the bolt fasteners 24 with this structure being conventional and preferably provided with a lock washer or the nuts 34 may be other types which will lock themselves into position on the bolt 24, thus retaining the adapter block and front plate 28 rigidly affixed to the shank 10 with the plate 28 also curving to conform with the curvature of the shank 10. As illustrated in the drawing, the apertures 30 in the plate 28 are offset toward the upper end thereof so that the plate 28 extends beyond the end of the shank 10 for engagement with the sweep shovel to reinforce a relatively weak area of the sweep shovel, thereby reducing breakage.

The rear portion of the block 16 is provided with a plurality of spaced apertures 36 which are spaced longitudinally along the length of the adapter block 16 for receiving a fastening bolt 38 therethrough which is used to secure the sweep shovel 12 to the shank 10 with the fastener 38 being in the form of a bolt with a retaining nut 40 or any other type of fastener bolt, pin, or the like, such as the split pin with resilient insert, as disclosed in my prior U.S. Pat. No. 3,773,114.

Figure 1:
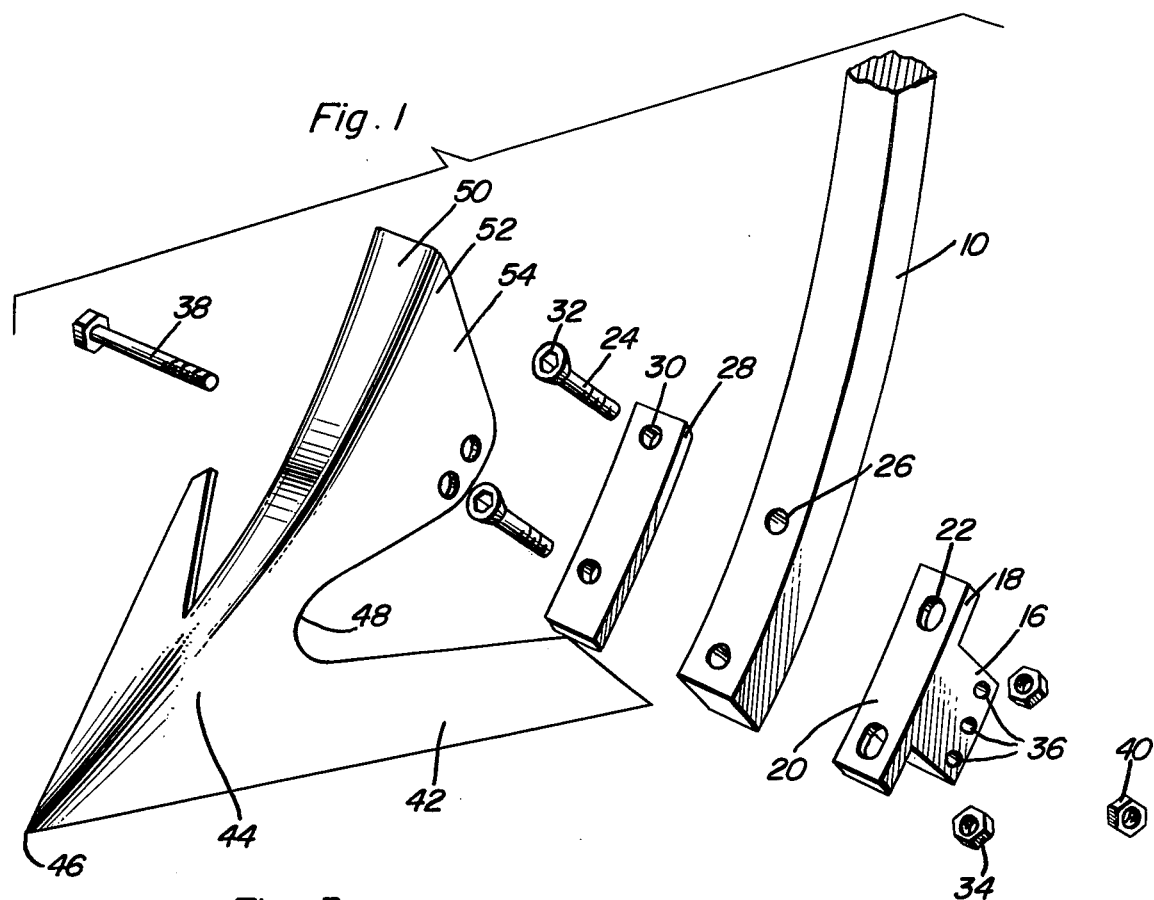
FIG. 1 is an exploded group perspective view of the shovel coupling of the present invention.
Figure 3:
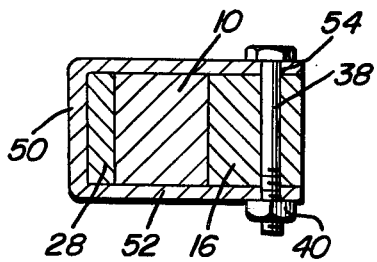
FIG. 3 is a transverse, sectional view taken substantially upon a plane passing along section line 3—3 of FIG. 2 illustrating further structural details of the invention.

The sweep shovel 12 is of one-piece construction and includes a pair of wings or sweeps 42 and a rearwardly and upwardly curved body portion 44 having a forwardly directed point 46 at the lower end thereof. The point 46 and the bottom edges of the sweeps 42 are generally horizontally disposed and the sweeps are of relatively narrow vertical dimension. While a sweep shovel has been illustrated, the adapter block and related structure forming the coupling is also fully capable of use with field cultivators, and the like. A reduced neck portion 48 extends upwardly from the juncture line or ridge 44 of the shovel and terminates in a generally inverted U-shaped attaching portion 50 having substantially parallel walls or legs 52 straddling and receiving therebetween the front plate 28, shank 10 and adapter block 16, as illustrated in FIG. 3. The rearward or bottom end of the legs or walls 52 is provided with apertures 54 for receiving one or more fastener bolts 38 and for alignment with one or more of the apertures 36, so that the position of the sweep shovel in relation to the shank 10 can be varied, thereby adjusting the angle of attack of the sweep shovel 12 so that the sweep shovel can be used with either of the standard stem angles of the cultivator shank.

Depending upon the thickness of the cultivator shank 10, one or more front plates 28 may be utilized so that the front of the neck portion of the sweep shovel will rest against and be reinforced by the front plate 28. The use of an additional front plate as a shim maintains the same front to rear distance between the front surface of the forwardmost front plate and the three holes. By utilizing a plurality of holes in the adapter block and one or more holes in the mounting portion of the sweep shovel, the angle of attack of the sweep shovel may be varied to obtain optimum results regardless of soil conditions.

This device enables quick attachment of the sweep shovel and easy adjustment of the angle of attack thereof, since it is only necessary to remove a single fastener, such as bolt 38, to enable replacement of or adjustment of the shovel and the replacement of the single fastener after a new shovel has been placed in position or the shovel has been adjusted to a desired position.

The specific configuration of the sweep shovel enables substantially all of the material from a rectangular sheet stock in the form of a metal plate of the proper gauge to be utilized when forming the sweep shovels, since the over-all plan configuration of the sweep shovel when in planar, unformed condition is generally V-shaped with the apex and bases of the V-shaped or triangular shaped blanks being oppositely arranged along the length of a generally rectangular plate with, of course, the portions defining the narrow neck and mounting portions of the shovel being discarded during the stamping process of forming the sweep shovel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a cultivator shovel having a mounting portion, a shank for supporting the shovel and a coupling connecting the mounting portion of the shovel to said shank, said coupling including an adapter block, means releasably and rigidly securing said block to said shank independently of the shovel and means adjustably and removably securing the mounting portion of the shovel to said adapter block for enabling replacement of the shovel and varying the angle of attack of the shovel in relation to the soil to be cultivated without changing the position of the block in relation to the shank, said shank including a forwardly and downwardly angled stem at a predetermined angle, said adapter block being disposed against the rear surface of the shank at the lower end thereof, said means securing the adapter block to the shank including fastener means extending through the shank and adapter block for securing the block to the shank independent of the means securing the shovel to the block, said means securing the mounting portion of the shovel to the adapter block including a plurality of transverse holes in the adapter block spaced from each other in the longitudinal direction of the shank, said mounting portion of the shovel including a pair of legs straddling the shank and adapter block with each of the legs including an aperture therein receiving a fastener therethrough with the fastener also extending through one of the holes in the adapter block, thereby removably securing the shovel to the shank in adjusted position for varying the angle of attack of the shovel, said shovel including a neck portion immediately adjacent and below the mounting portion and sweeps immediately adjacent and below the neck portion with the neck portion having less cross-sectional dimension than the mounting portion and sweeps, a front plate mounted on the shank along the forward surface thereof and being secured to the shank by the same fastening means which secures the adapter block thereto, the lower end of the front plate extending along the inner surface of the neck portion of the sweep shovel for reinforcing and strengthening the neck portion of the sweep shovel to reduce breakage, said shank being oriented at a predetermined stem angle with the plurality of transverse holes in the adapter block being oriented to enable a sweep shovel to be employed with any standard shank stem angle presently used on cultivators, said mounting block, shank and front plate being of the same width and having coinciding planar side surfaces, said mounting portion of the shovel including a web portion joining the legs with the inner surface of the mounting portion conforming with and in surface-to-surface contact with the front plate, shank and block, said front plate extending longitudinally beyond the lower end of the shank in cantilever fashion to support the neck portion of the shovel, said block including end extensions engaging the rear surface of the shank, said fastener means securing the block to the shank including a pair of bolts extending through the front plate, shank and extensions on the block, said bolts including heads countersunk into the front surface of the front plate, said plurality of holes in the block being disposed adjacent the rear edge thereof and said fastener extending through the legs and one of the holes in the block being a bolt to clampingly engage the legs with a major portion of the side surfaces of the block.

2. In combination, a cultivator shovel having a mounting portion, a shank for supporting the shovel and a coupling connecting the mounting portion of the shovel to said shank, said coupling including an adapter block, means releasably and rigidly securing said block to said shank independently of the shovel and means adjustably and removably securing the mounting portion of the shovel to said adapter block for enabling replacement of the shovel and varying the angle of attack of the shovel in relation to the soil to be cultivated without changing the position of the block in relation to the shank, said shank including a forwardly and downwardly angled stem at a predetermined angle, said adapter block being disposed against the rear surface of the shank at the lower end thereof, said means securing the adapter block to the shank including fastener means extending through the shank and adapter block for securing the block to the shank independent of the means securing the shovel to the block, said means securing the mounting portion of the shovel to the adapter block including a plurality of transverse holes in the adapter block spaced from each other in the longitudinal direction of the shank, said mounting portion of the shovel including a pair of legs straddling the shank and adapter block with each of the legs including an aperture therein receiving a fastener therethrough with the fastener also extending through one of the holes in the adapter block, thereby removably securing the shovel to the shank in adjusted position for varying the angle of attack of the shovel, said shank being oriented at a predetermined stem angle with the plurality of transverse holes in the adapter block being oriented to enable a sweep shovel to be employed with any standard shank stem angle presently used on cultivators, said mounting block and shank being of the same width and having coinciding planar side surfaces, said mounting portion of the shovel including a web portion joining the legs and oriented in transverse relation to the shank with the legs in surface-to-surface contact with the shank and block, said block including end extensions engaging the rear surface of the shank, said fastener means securing the block to the shank including a pair of bolts extending through the shank and extensions on the block, said plurality of holes in the block being disposed adjacent the rear edge thereof and said fastener extending through the legs and one of the holes in the blocks being a bolt to clampingly engage the legs with a major portion of the side surfaces of the block, and a front plate mounted on the shank along the forward surface thereof and having the same width as the shank and mounting block, said pair of bolts extending through the shank and extensions on the block also extending through the front plate with the bolts having countersunk heads received in the front plate thereby providing a smooth forward surface to the front plate with the mounting portion of the shovel being disposed in surface-to-surface engagement with the front surface of the front plate, said front plate extending longitudinally beyond the lower end of the shank in cantilever fashion to support a portion of the shovel which extends below the lower end of the shank.

* * * * *